United States Patent Office 3,264,292
Patented August 2, 1966

3,264,292
DIHYDROBENZOTHIADIAZINE DERIVATIVES
Warren J. Close, Waukegan, Ill., assignor to Abbott Laboratories, North Chicago, Ill., a corporation of Illinois
No Drawing. Filed Nov. 3, 1958, Ser. No. 771,252
2 Claims. (Cl. 260—243)

The present invention is concerned with new chemical compounds corresponding to the formula

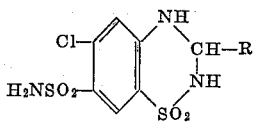

and non-toxic alkali metal salts thereof. In this and succeeding formulas, R represents hydrogen, lower alkyl containing from 1 to 4 carbon atoms, inclusive, lowercycloalkyl containing from 3 to 6 carbon atoms, inclusive, or haloloweralkyl wherein the halogen has an atomic weight of from 17 to 36.

These dihydrobenzothiazine-1,1-dioxide compounds are crystalline solids soluble in polar organic solvents but only sparingly soluble in water. They are useful as chemotherapeutic agents since they possess the interesting pharmacological property of increasing the flow of urine which is characteristic of a diuretic agent. The compounds are of low toxicity and are effective diuretics when administered orally or by injection.

To prepare the new compounds, at least one molecular proportion of an aldehyde of the formula

is reacted with one molecular proportion of 5-chloro-2,4-disulfamylaniline having the formula

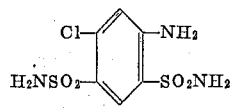

In one method, the reaction is carried out in the presence of an inert inorganic solvent such as acetone, dimethylformamide or tetrahydrofuran in the absence of a catalyst. In an alternative method, the reaction is carried out in water, methanol or ethanol but in the presence of a catalyst such as ammonium chloride. In either method, good results are obtained when employing a substantial molecular excess of the aldehyde. The reaction takes place smoothly at temperatures of from 20° C. to the boiling temperature of the reaction mixture with the formation of the desired product and water of reaction. Upon completion of the reaction, the desired product may be separated by conventional means.

In one method of carrying out the reaction, the 5-chloro-2,4-disulfamylaniline dissolved in the reaction solvent (preferably dimethylformamide) is heated conveniently at the boiling temperature and the aldehyde contacted with the resulting solution. Refluxing is thereafter continued for a period of time to complete the reaction. The reaction mixture is then cooled and the solid product which precipitates is separated and recrystallized from water. Alternatively, the 5-chloro-1,4-disulfamylaniline may be dissolved in boiling water, methanol or ethanol and an aqueous solution of the aldehyde and ammonium chloride added dropwise thereto. The solid which forms is then separated and purified by recrystallization.

The alkali metal salts of the compounds of this invention can be prepared by dissolving the selected compound in an aqueous or alcoholic solution of the alkali metal hydroxide such as sodium hydroxide, potassium hydroxide or lithium hydroxide. If desired, the salt may be isolated by evaporating the solvent.

The following examples are presented to illustrate but not limit the invention.

EXAMPLE I

*6-chloro-7-sulfamyl-3,4-dihydro-1,2,4-benzothiadiazine-1,1-dioxide*

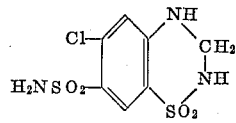

5-chloro-2,4-disulfamylaniline (5.7 g., 0.02 mole) was dissolved in 15 ml. of dimethylformamide and the resulting solution heated at the boiling temperature and under reflux. Formaldehyde in the gaseous state was then passed through the liquid reaction mixture for a period of 20 minutes. Refluxing was thereafter continued for 10 minutes. Upon completion of the reaction, the reaction mixture was cooled and poured into ice water. The 6-chloro-7-sulfamyl-3,4-dihydro - 1,2,4 - benzothiadiazine-1,1-dioxide which precipitated was separated by filtration and after recrystallization from water was found to melt at 270°–271° C. with decomposition. Anal. calcd. for $C_7H_8ClN_3O_4S_2$: C=28.2%; H=2.7%; N=14.1%. Found: C=28.3%; H=2.8%; N=14.3%.

In an alternative method of preparation, 5.7 g. (0.02 mole) of 5-chloro-2,4-disulfamylaniline was dissolved in 150 ml. of boiling water and a solution of 1.9 ml. of 37% formalin and 1.2 grams of ammonium chloride in 15 ml. of water was added dropwise thereto. Refluxing was then continued for one hour. The desired product separated upon cooling the reaction mixture and after recrystallization from water was found to have the same analysis and melting point as that previously obtained.

The sodium salt of 6-chloro-7-sulfamyl-3,4-dihydro-1,2,4-benzothiadiazine-1,1-dioxide is prepared by dissolving the dioxide compound in alcoholic sodium hydroxide and evaporating the solvent in a vacuum.

EXAMPLE II

*6-chloro-3-ethyl-7-sulfamyl-3,4-dihydro-1,2,4-benzothiadiazine-1,1-dioxide*

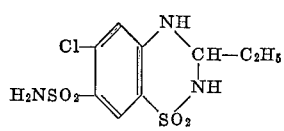

A mixture of 5.7 grams (0.02 mole) of 5-chloro-2,4-disulfamylaniline and 5.8 grams (0.10 mole) of propionaldehyde was refluxed in 75 ml. of acetone for 2 hours. The solvent was then removed, the residue washed with chloroform and recrystallized from an alcohol-water mixture. There was thus obtained 6-chloro-3-ethyl-7-sulfamyl-3,4-dihydro-1,2,4-benzothiadiazine-1,1dioxide as a crystalline solid which melted at 266°–267° C. with decomposition. Anal. calcd. for $C_9H_{12}ClN_3O_4S_2$: C=33.2%; H=3.8%; N=12.9%. Found: C=33.3%; H=3.8%; N=13.0%.

EXAMPLE III

*6-chloro-3-trichloromethyl-7-sulfamyl-3,4-dihydro-1,2,4-benzothiadiazine-1,1-dioxide*

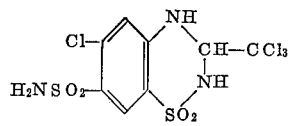

A mixture of 5.7 grams (0.02 mole) of 5-chloro-2,4-disulfamylaniline and 5.9 grams (0.04 mole) of chloral in 25 ml. of dimethylformamide was heated at the boiling temperature and under reflux for 30 minutes. The reaction mixture was thereafter poured into a mixture of ice and water to precipitate the desired 6-chloro-7-sulfamyl-3-trichloromethyl-3,4-dihydro - 1,2,4 - benzothiadiazine-1,1-dioxide as a crystalline solid melting at 302°–304° C. with decomposition.

EXAMPLE IV 6-chloro-3-isopropyl-7-sulfamyl-3,4-dihydro-1,2,4-benzothiadiazine-1,1-dioxide

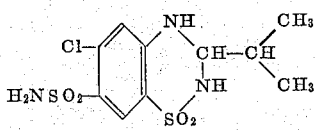

A mixture of 5.7 grams (0.02 mole) of 5-chloro-2,4-disulfamylaniline and 7.2 grams (0.10 mole) of isobutyraldehyde in 75 ml. of acetone was heated at the boiling temperature and under reflux for a period of 2 hours. The reaction mixture was then processed as described in Example II to obtain the desired 6-chloro-3-isopropyl-7-sulfamyl-3,4-dihydro-1,2,4-benzothiadiazine-1,1 - dioxide as a crystalline solid melting at 286°–290° C. Anal. calcd. for $C_{10}H_{14}ClN_3O_4S_2$: C=35.3%; H=4.2%; N=12.4%. Found: C=35.2%; H=4.4%; N=12.4%.

In a manner similar to that described in the foregoing examples, other dihydrobenzothiadiazine-1,1-dioxides are prepared as follows:

6-chloro-3-cyclopropyl-7-sulfamyl-3,4-dihydro - 1,2,4-benzothiadiazine-1,1-dioxide by the reaction of cyclopropyl carboxaldehyde and 5-chloro-2,4-disulfamylaniline.

6-chloro-3-cyclobutyl-7-sulfamyl - 3,4 - dihydro - 1,2,4-benzothiadiazine-1,1-dioxide by the reaction of cyclobutyl formaldehyde and 5-chloro-2,4-disulfamylaniline.

6-chloro-3-monochloromethyl-7-sulfamyl-3,4 - dihydro-1,2,4 - benzothiadiazine-1,1-dioxide; 6-chloro-3-dichloromethyl-7-sulfamyl-3,4-dihydro - 1,2,4 - benzothiadiazine-1,1 - dioxide; 6 - chloro - 3 - monofluoromethyl - 7-sulfamyl - 3,4 - dihydro - 1,2,4 - benzothiadizine-1,1 - dioxide; 6 - chloro-3-difluoroethyl-7-sulfamyl-3,4-dihydro-1,2,4-benzothiadiazine-1,1-dioxide and 6-chloro-3-trifluoromethyl - 7 - sulfamyl-3,4-dihydro-1,2,4-benzothiadiazine-1,1-dioxide by the reaction of 5 chloro-2,4-disulfamylaniline with monochloroacetaldehyde, dichloroacetaldehyde, monofluoroacetaldehyde, difluoropropionaldehyde or trifluoroacetaldehyde, respectively.

6-chloro-3-methyl-7-sulfamyl - 3,4 - dihydro - 1,2,4-benzothiadiazine-1,1-dioxide and 6-chloro-3-butyl-7-sulfamyl-3,4-dihydro-1,2,4-benzothiadiazine-1,1 - dioxide by the reaction of 5-chloro-2,4-disulfamylaniline with acetaldehyde or valeraldehyde, respectively.

What I desire to particularly point out and distinctly claim as my invention is:

1. A compound of the formula

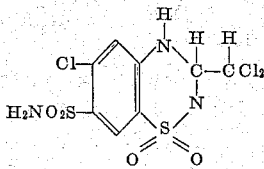

2. A compound of the formula

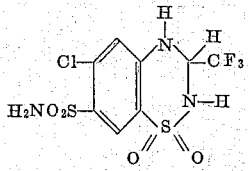

References Cited by the Examiner

UNITED STATES PATENTS 2,809,194  10/1957  Novello ............. 260—243
3,163,645  12/1964  De Stevens et al. ____ 260—243

OTHER REFERENCES

Freeman et al.: Journ. of Org. Chem., vol. 16, June 1951, (pages 815–835).

NICHOLAS S. RIZZO, *Primary Examiner.*

H. J. LIDOFF, IRVING MARCUS, *Examiners.*

W. KAUFMAN, *Assistant Examiner.*